Figure 1:
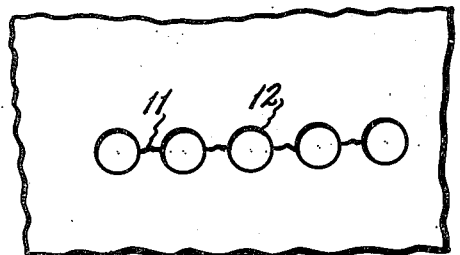

Nov. 5, 1946.　　　　　L. B. SCOTT　　　　　2,410,464
BONDING METHOD
Filed Sept. 27, 1943　　　2 Sheets—Sheet 1

Inventor
Lawrence B. Scott

By
Jack A. Ackley
Joseph H. Ackley
Attorneys

Nov. 5, 1946.  L. B. SCOTT  2,410,464
BONDING METHOD
Filed Sept. 27, 1943  2 Sheets-Sheet 2

Inventor
Lawrence B. Scott
By
Jack A. Athley
Joseph H. Athley
Attorneys

Patented Nov. 5, 1946

2,410,464

UNITED STATES PATENT OFFICE 2,410,464

BONDING METHOD

Lawrence B. Scott, Columbus, Ohio

Application September 27, 1943, Serial No. 503,961

5 Claims. (Cl. 29—148)

This invention relates to new and useful improvements in bonding methods.

Heretofore, it has been the customary practice in brazing and welding fractures or joints to groove the same for the reception of the bonding material which makes it necessary to preheat the bottom of the groove to a temperature of approximately 500° F. in order to tin, flux or weld said bottom. It is well known that this preheating of the groove bottom will result in the excessive heating of the adjacent portions of the member or members being joined and a consequent expansion thereof, thereby reducing the width of the groove and subjecting the bond to subsequent tension and distortion. Frequently, a separation of the joined member or members or cracking of the adjacent portions thereof occurs prior to complete cooling and contraction of the heated portions.

Therefore, one object of the invention is to provide an improved bonding method employing minimum heat so as to eliminate excessive heating of the member or members being bonded.

An important object of the invention is to provide an improved method of bonding wherein the instantaneous and effective absorption of heat by the portions of the member or members adjacent the fracture or joint is effected so as to necessitate a minimum application of heating and thereby avoid overheating of said portions; the minimum application of heat preventing the sweating of impurities from the member or members which causes "blow-holes" and obviating "hard spots" in the bond.

Another object of the invention is to provide an improved bonding method wherein the preparation prior to bonding of the fracture or joint eliminates overheating and expansion of the member or members during the application of heat, whereby a considerable portion of the bonded area is in shear which is distributed to prevent a line of fatigue or fatigue points and whereby said area is not left in a condition of stress nor the bond in complete tension; it also being possible to pre-freeze the portions of the member adjacent its fracture so as to shrink or contract said portions and expand or widen the fracture, whereby subsequent cooling and expansion of the portions will compress the bond.

A particular object of the invention is to provide an improved bonding method, of the character described, wherein the fracture or joint to be bonded is provided with a plurality of openings in addition to being grooved, thereby permitting a rapid absorption of heat by the bonded area which causes the surfaces adjacent said fracture to flux or tin without preheating and without overheating of said bonded area.

A further object of the invention is to provide an improved bonding method, of the character described, wherein the fracture or joint has the cross-sectional area of its surface amplified for the rapid reception and retention of the requisite amount of heat upon a minimum application of the same.

Still another object of the invention is to provide an improved bonding method, of the character described, wherein a deflecting element or a plurality of small openings may be employed to reflect and distribute heat to the bonded area so as to effect rapid heating of said area without overheating.

A construction designed to carry out the invention will be hereinafter described together with other features of the invention.

Figure 2:
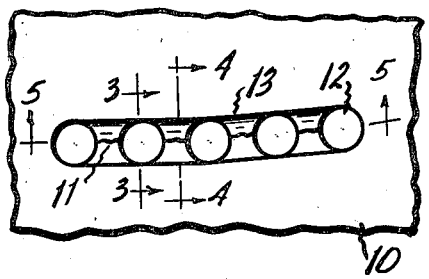
Figure 3:
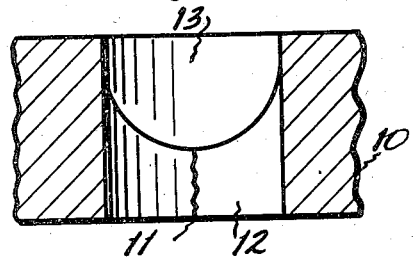
Figure 4:
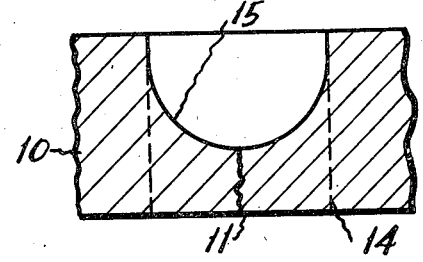
Figure 5:
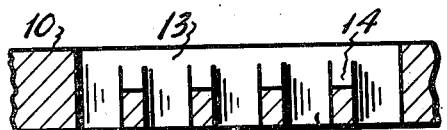
Figure 6:
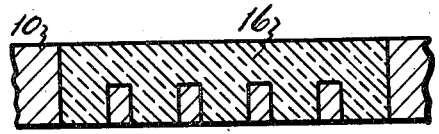

The invention will be more readily understood from a reading of the following specification and by reference to the accompanying drawings wherein an example of the invention is shown, and wherein:

Figure 1 is a plan view of a portion of a casting having a fracture therein, illustrating the step of forming openings in the fracture in accordance with the invention, Figure 2 is a view, similar to Figure 1, showing the step of grooving the fracture, Figure 3 is an enlarged, transverse, vertical, sectional view, taken on the line 3—3 of Figure 2, Figure 4 is a similar view, taken on the line 4—4 of Figure 2, Figure 5 is a longitudinal, sectional view, taken on the line 5—5 of Figure 2, Figure 6 is a view, similar to Figure 5, of the fracture after bonding.

Figure 8:
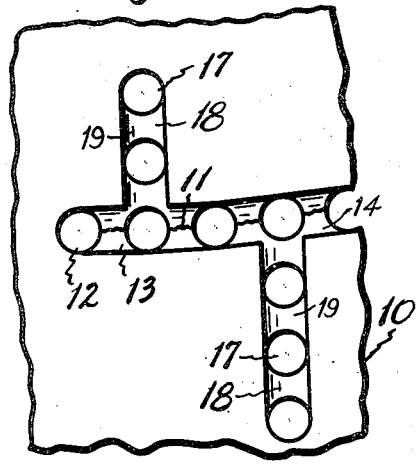
Figure 7:
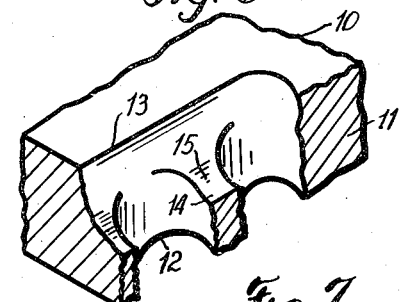
Figure 10:
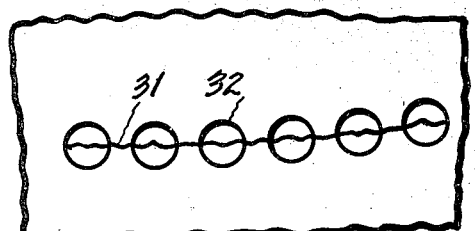
Figure 11:
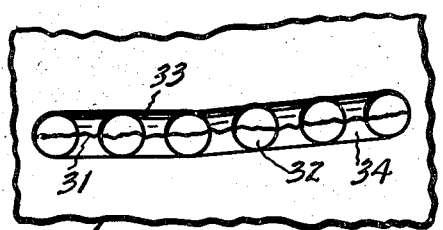
Figure 12:
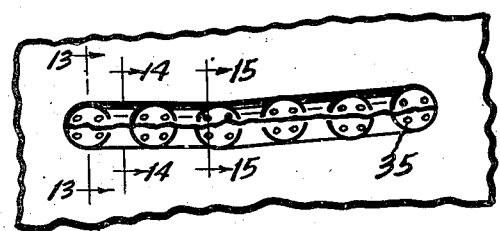
Figure 13:
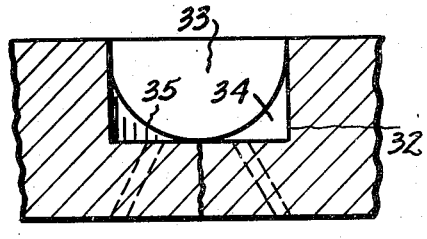
Figure 14:
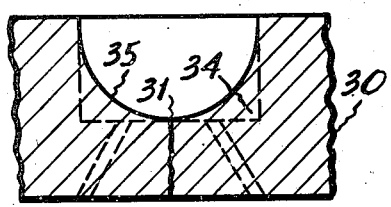
Figure 15:
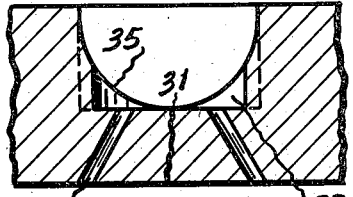
Figure 16:
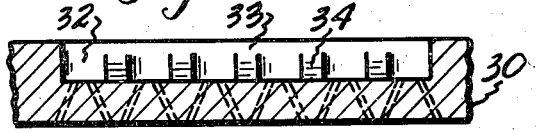
Figure 17:
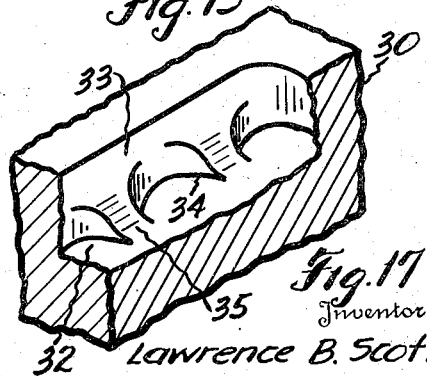
Figure 9:
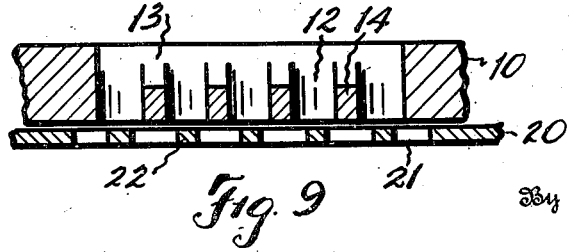

Figure 7 is an enlarged, isometric view of the fracture, showing the relationship of the groove and openings, Figure 8 is a plan view of an alternative step of the method, Figure 9 is a transverse, vertical, sectional view of a fracture prior to bonding, illustrating the use of a deflecting element, Figures 10 and 11 are views, similar to Figures 1 and 2, illustrating a modification of the preliminary steps of the method, Figure 12 is a similar view, illustrating the provision of a plurality of reduced ports in the lower portion of the fractured area, Figures 13, 14 and 15 are enlarged, transverse, vertical sectional views, taken on the lines 13—13, 14—14 and 15—15 of Figure 12, respectively, Figure 16 is a longitudinal, sectional view of the fracture shown in Figure 12, and Figure 17 is an enlarged, isometric view of a portion of the fracture prior to the provision of the reduced ports.

In the drawings, the numeral 10 designates a casting or other member having a fracture or crack 11 therein. In carrying out the improved method, a plurality of spaced openings 12 are formed in the casting throughout the length of the fracture 11 in any suitable manner. The openings 12 extend entirely through the casting and preferably have their axes vertically-alined with the fracture. Although not absolutely essential, it is desirable that the openings be spaced relatively close to one another so that substantially three-fourths of the fracture is occupied by said openings. The upper portion of the openings are next interconnected by forming a groove 13 which is co-extensive with the fracture and which is of a depth equal to approximately one-half the thickness of the casting 10. As is clearly shown in Figures 3 and 4, the groove 13 is preferably arced or curved in cross-section and provides a plurality of spaced ribs or bridges 14 between the openings 12. Due to the cross-sectional contour of the groove, each bridge 14 has a curved or arced upper surface 15 as shown in Figure 7.

Manifestly, the provision of both the openings and the groove greatly amplifies the cross-sectional area of the surfaces of the fracture, with the result that an enlarged area is presented to the bonding material. Attention is directed to the fact that the bridges 14, which are formed by the arrangement of the openings and groove, provide most of the amplified area and materially assist in the effective and instantaneous absorption of heat, whereby the amplified surfaces will flux or tin without preheating. Due to these amplified surfaces, the heat generated by the brazing torch or welding arc is rapidly received and distributed to the area surrounding the fracture because the heat may pass entirely through said fracture and is not trapped in and deflected upwardly and outwardly of the groove. Thus, it is not necessary to overheat the upper portion of the casting and a considerable area surrounding the fracture in order to bring the lower portion of the fractured area to the requisite temperature.

From the foregoing, it is readily apparent that although the bonding operation, per se, is performed in the usual manner, the preparation of the fracture makes it possible to obtain improved results. Since the prepared fracture is not subjected to excessive heat, there is no overheating and consequent expansion of a portion of the fractured area. Therefore, the bonding material 16 is not in tension and is not subject to distortion and failure upon cooling of the fractured area. Also, a considerable portion of the fractured area after bonding is in shear which is evenly distributed so as to eliminate the possibility of a line of fatigue or fatigue points.

If desired, the casting 10 may be frozen so as to contract or shrink the same and enlarge the prepared fracture prior to the bonding operation, whereby the fractured area will expand upon reaching atmospheric temperature so as to compress the bond or bonding material 16. This treatment is made possible by the fact that no portion of the casting, including the fractured portion, is overheated by the application of heat.

As shown in Figure 8, the fractured area to be bonded may be reinforced by lateral or transverse extensions of the openings 12 and groove 13. In this event, several openings 17 are formed in the casting laterally of one of the openings 12 and with their axes preferably disposed in the same vertical plane. The upper portions of the openings 17 are then interconnected by a groove 18 which is identical to the main groove 13 and which communicates therewith. Intermediate ribs or bridges 19, similar to the bridges 14, are formed between the openings 17 and the alined openings 12 by the groove 18. It is preferable to offset or stagger the openings and grooves which are disposed on opposite sides of the fracture 11. Manifestly, the provision of laterally-disposed openings and grooves provides additional area for receiving the bonding material so as to reinforce and permanently integrate the fractured area.

To assist in the distribution of the heat generated by the torch or arc and the flow of the bonding material, an elongate deflecting plate or sheet 20 may, if desired, be disposed beneath or behind the casting having the fracture therein. A plurality of spaced openings, having substantially the same diameter as the openings 12 are formed in the plate which is preferably positioned so that the openings are offset or staggered relative to each other. Thus, the openings 21 are disposed beneath the bridges 14 and the openings 12 overlie the intermediate or bridging portions 22 of the plate 20. Since the latter is placed in close proximity to the under or rear surface of the casting, it is manifest that the heat escaping from the openings 12 will be deflected back into the same as well as toward the area immediately surrounding the fracture. However, due to the openings 21, the passage of heat is not prevented, the escape of heat being retarded or delayed rather than prevented. It is preferable to form the plate 20 of sheet metal so that it will quickly tin or flux so as to retain the molten bonding material which flows into and through the openings 12. Thus, the bonding operation may be performed more thoroughly and rapidly. Although the deflecting plate has been shown and illustrated as having its openings offset or staggered relative to the openings 12 formed in the casting, it is manifest that the same results could be obtained without said offsetting or staggering by reducing the diameter of said plate openings.

In some types of bonding operations, such as in the case of a jacket or manifold, it is extremely difficult if not impossible to use a deflecting plate. In these instances, the fracture is repaired in the manner shown in Figures 10 to 17. A plurality of spaced recesses 32, circular in cross-section and similar to the openings 12, are drilled, cut, punched or otherwise formed in the casting 30 throughout the length of its fracture 31 and are then merged by a co-extensive groove 33. As shown in Figure 13, the recesses 32 extend substantially through one-half of the thickness of the casting with the result that the bottom of each recess is disposed in the same horizontal plane as the lowest point of the groove. Due to the curvature or arc of the cross-sectional contour of the groove, a rib or bridge 34 is formed between adjacent recesses 32. Each rib 34 has a curved or arced upper surface 35, the central portion of which merges with the bottom or low point of the groove.

To assure the passage of heat through the casting 30, a plurality of ports 36 are formed in the lower portion of said casting and have their upper ends communicating with the recesses 32, being preferably spaced equi-distantly with equal distribution on opposite sides of the fracture 31. As is clearly shown in Figures 15 and 16, the ports 36 are disposed at a radial angle relative to the recess 32 with which they communicate, whereby said ports are disposed at an angle transversely and longitudinally of the groove and fracture. Manifestly, the reduced diameter of the ports 36 perform the same function as the perforated deflector plate 20 in that said ports tend to delay or retard the passage of heat and assist in the even distribution of the same. Also, a portion of the heat passing into the ports 36 is deflected back into the recesses 32 so as to more quickly heat the surfaces thereof.

Attention is directed to the fact that the ports not only retard the passage of heat through the castings due to their reduced diameter, but also due to their inclination. In other words, the reduced cross-sectional area and inclination of the ports co-act to reduce the rate of the escaping heat so as to prolong the passage of the same through the lower portion of the casting as well as to retain said heat within the upper or cut away portion of the casting. It is believed to be obvious that the recesses 32, groove 33, and ribs 34 amplify or enlarge the surfaces of the fracture 31 for the purpose hereinbefore explained. Due to the fact that the passage of heat through the fractured area is only delayed and not prevented, it is manifest that said area will quickly attain the desired temperature so as to bring about rapid tinning or fluxing as well as the retention of the molten bonding material.

Although the hereinbefore described methods may be employed in connection with either brazing or welding, the same are probably most beneficial when used preparatory to the former. The two methods described hereinbefore are manifestly similar and substantially identical results are obtained by each. Manifestly, any fracture, joint, or seam could be bonded in accordance with the methods, although only a fracture has been shown and described.

The foregoing description of the invention is explanatory thereof and various changes in the size, shape, and materials, as well as in the details of the illustrated construction may be made, within the scope of the appended claims, without departing from the spirit of the invention.

What I claim and desire to secure by Letters Patent is:

1. The method of bonding a metal fracture which includes, grooving the metal along the fracture so as to amplify the cross-sectional area of the surfaces thereof, removing additional metal at closely spaced intervals along the groove so as to form spaced projections in the bottom of said groove for further increasing the area of the fracture surfaces, then forming openings below the groove at the intervals whereby additional metal is removed for the passage of heat, and then depositing bonding metal in the fracture.

2. The method of bonding a metal fracture which includes forming a plurality of spaced openings in the metal along the fracture, removing the upper portion of said metal along said fracture so as to provide a groove which interconnects the upper ends of the openings and forms ribs therebetween, placing a deflecting element having openings therein beneath said fracture openings to retard the passage of heat therethrough and deflect a portion of heat back into the fracture openings, and then depositing bonding metal in said fracture.

3. The method of bonding a metal fracture which includes forming a plurality of closely spaced recesses in the metal along the fracture, removing a portion of the metal between the recesses so as to interconnect the same and form ribs therebetween, forming openings in the bottom of each recess for the passage of heat, and then depositing bonding metal in said fracture.

4. The method of bonding a metal fracture which includes removing the metal along the fracture throughout its length in an irregular manner so as to provide a groove having alternate depressions and projections throughout said fracture so as to amplify the cross-sectional area of the surfaces thereof, providing heat passages in said metal below the depressions, and then depositing bonding metal in the fracture.

5. The method set forth in claim 4 wherein the heat passages are constricted by placing a deflecting element having openings therein therebeneath so as to retard the flow of heat, the openings being offset relative to said passages so as to partially close the same.

LAWRENCE B. SCOTT.